United States Patent [19]

Scheideler

[11] Patent Number: 5,897,890

[45] Date of Patent: Apr. 27, 1999

[54] FEED TO PRODUCE OMEGA-3 FATTY ACID ENRICHED EGGS AND METHOD FOR PRODUCING SUCH EGGS

[76] Inventor: Sheila E. Scheideler, 6000 Dobson Ct., Lincoln, Nebr. 68516

[21] Appl. No.: 08/842,297

[22] Filed: Apr. 23, 1997

[51] Int. Cl.$^6$ .................................................. A23K 1/165
[52] U.S. Cl. ............................. 426/2; 426/53; 426/630; 426/807
[58] Field of Search ................................ 426/2, 53, 807, 426/630

[56] References Cited

U.S. PATENT DOCUMENTS

| | | | |
|---|---|---|---|
| 5,012,761 | 5/1991 | Oh | 119/6.8 |
| 5,133,963 | 7/1992 | Ise | 424/94.61 |
| 5,246,717 | 9/1993 | Aarwin | 426/2 |

FOREIGN PATENT DOCUMENTS

| | | |
|---|---|---|
| 88/10112 | 12/1988 | WIPO . |
| 96/05739 | 2/1996 | WIPO . |

OTHER PUBLICATIONS

Ferrier et al., Egg Uses Process. Technol., pp. 362–373, 1994.

Cherian et al., Poultry Sci, vol. 70(4), pp. 917–922, 1991.

Fitch, Inform, vol. 4(4) pp. 371, 373, 1993.

Scheideler, Sheila E. et al, "Dietary Flaxseed for Poultry: Production Effects, Omega–3 Fatty Acid Incorporation Into Eggs and Sensory Analysis", The Nebraska Poultry Report 1994, pp. 6–8.

Scheideler, Dr. Sheila E., et al., "Dietary Flaxseed for Poultry; Production Effects, Dietary Vitamin Levels, Fatty Acid Incorporation into Eggs and Sensory Analysis", Proceedings of the 55th Flax Institute of the United States, Jan. 26–28, 1994, Fargo, ND.

Scheideler, Dr. Sheila E. et al., "Use of Enzymes in Poultry Rations Containing Flaxseed", Proceedings of the 56th Flax Institute of the United States, Mar. 20–22, 1996, Fargo, ND.

Scheideler, S.E., et al., Metabolism and Nutrition, "The Combined Influence of Dietary Flaxseed Variety, Level, Form, and Storage Conditions on Egg Production and Composition Among Vitamin E–Supplemented Hens", pp. 1221–1226, Departments of Animal Science and Food Science and Technology, University of Nebraska, Lincoln, NE 68583–0908., Poultry Science, vol. 75, 1996.

Hickling, Dave, "Flax has Potential in Livestock, Poultry and Pet Diets", Feedstuffs, Jan. 20, 1997.

Scheideler, Dr. Sheila E., "Least Costing Flax Into Poultry Rations", Dept. Animal Science, IANR, University of Nebraska, Lincoln, NE 68583–0908, pp. 96–97; Nebraska Cooperative Extension, 1994; Poultry News, Winter and Processing 55th Flax Institute of the United States, 1994.

Scheideler, Sheila E. et al., "Strain and Dietary Oats Effects on Flax Fed Hen's Egg Composition and Fatty Acid Profile", Abstracts of Papers p. 165, Abstract #495, Dept. Animal Sci, University of Nebr., Lincoln, NE 68583–0908 (only abstract was published); Poultry Science, 1995 V74 (Suppl. 1) p. 165.

Scheideler, Sheila E., et al., "Dietary Flaxseed Improves Egg Production and Incorporation of Omega Fatty Acids in Eggs", Abstracts of Papers p. 50, Abstract #148, Dept. of Animal Science and Dept. of Food Science, University of Nebraska, Lincoln, NE 68583–0908 (only abstract was published); Poultry Science, 1994, V73 (Suppl. 1) p. 50.

Scheideler, Sheila E., et al., "Effect of Dietary Flaxseed and Fish Oil on Egg Components, Sensory Analysis and Oxidation Products", Abstracts of Papers p. 118, Abstract #353, Dept. Animal Science and Dept. of Food Science, University of Nebraska, Lincoln, NE 68583–0908 (only abstract was published); Poultry Science, 1994, V73 (Suppl. 1) p. 118.

Primary Examiner—Chhaya D. Sayala
Attorney, Agent, or Firm—Shook, Hardy & Bacon

[57] ABSTRACT

A method for producing Omega-3 fatty acid enriched eggs includes the step of mixing a feed comprised of corn, soybean meal, flaxseed, oyster shell, limestone, salt, vitamin premix, mineral premix, Vitamin E premix, methionine, animal/vegetable fat blend, pectinase and glucanase enzyme product, and phosphorus. The method further includes feeding the hen a feed ration of 100–110 g per day and having the hen lay the enriched eggs.

24 Claims, No Drawings

FEED TO PRODUCE OMEGA-3 FATTY ACID ENRICHED EGGS AND METHOD FOR PRODUCING SUCH EGGS

BACKGROUND OF THE INVENTION

This invention relates to eggs enriched with a predetermined amount of Omega-3 fatty acids. This invention also relates to a method for producing enriched eggs involving feeding hens a multiple phase flaxseed-based diet. Preferably, the enriched eggs of this invention each contain 350–450 mg of Omega-3 fatty acids where at least 250 mg of these acids are C18:3 (linolenic acid) and at least 100 mg are C22:6 (docosahexaenoic acid (DHA)). Most preferably, the enriched eggs of this invention each contain 400 mg of Omega-3 fatty acids.

It is beneficial for humans to consume eggs enriched with Omega-3 fatty acids for numerous reasons. There is a link between dietary n-3 fatty acid consumption and a decreased incidence of cardiovascular disease. In addition, consumption of Omega-3 fatty acid enriched eggs improves a person's HDL:LDL cholesterol ratio. Furthermore, enriched eggs are able to reduce a person's serum triglyceride levels. Although consumption of Omega-3 fatty acids is beneficial, dietary sources of these fatty acids are limited to certain types of fish and oilseed such as flax. Thus, incorporating these beneficial fatty acids into eggs provides an additional dietary n-3 fatty acid source for consumers.

Previous methods of producing enriched eggs involve feeding hens flax and/or fish oil, since both are rich sources of linolenic acid, an Omega-3 fatty acid. However, these methods have negative side effects. Flax-enriched diets used in these methods affect hen sensory properties and reduce the anti-oxidative properties of Vitamin E in the hens' systems. Furthermore, these diets produce eggs having a fishy flavor which are undesirable for consumption. Such diets also cause decreased egg production rates. In addition, previously introduced diets have not been refined into phases relating to egg production or egg size so as to guarantee a defined amount of Omega-3 fatty acid in each egg or to guarantee a certain n-6 to n-3 fatty acid ratio in the egg yolk.

A method for producing Omega-3 fatty acid enriched eggs is needed which produces eggs of a desirable flavor. In addition, a method is needed which is able to ensure a predetermined amount of Omega-3 fatty acids are consistently provided in each enriched egg. Still further, a diet for hens needs to be available which increases the amount of Omega-3 fatty acids in their eggs without causing adverse effects.

SUMMARY OF THE INVENTION

It is an object of the present invention to provide more healthful eggs. Specifically, it is an object of this invention to provide enriched eggs with a defined quantity of Omega-3 fatty acids in each egg regardless of egg size or hen age.

It is a further object of this invention to provide eggs each containing 350–450 mg of Omega-3 fatty acids where at least 250 mg of these acids are C18:3 (linolenic acid) and at least 100 mg are C22:6 (DHA).

Another object of this invention is to provide eggs having a 2:1 ratio of n-6 to n-3 fatty acids in the egg yolk.

Another object of this invention is to provide a method for producing Omega-3 fatty acid enriched eggs which involves feeding hens a two-phase flaxseed-based diet wherein hens are switched from one phase to the next phase based on their phase of egg production or egg size.

Still another object of the present invention is to maintain a high rate of egg production while providing a method for producing Omega-3 fatty acid enriched eggs.

It is a further object of the present invention to provide an economical method for producing high quality enriched eggs.

A further object of this invention is to provide consumers enriched eggs which when consumed are able to improve one's HDL:LDL cholesterol ratio, reduce one's serum triglyceride levels and reduce one's risk of cardiovascular disease.

Accordingly, the present invention provides a method for producing Omega-3 fatty acid enriched eggs wherein hens are fed a diet comprised of corn, soybean meal, flaxseed, limestone, oyster shell, dicalcium phosphate, animal/vegetable fat blend, salt, vitamin premix, mineral premix, Vitamin E premix, methionine, and pectinase and glucanase enzyme product. The proportions of these ingredients are adjusted in response to a hen's age or egg size. Feeding such a diet to hens is able to provide enriched eggs each containing 400 mg of Omega-3 fatty acids where at least 250 mg of these acids are C18:3 and at least 100 mg are C22:6. Such enriched eggs also have a 2:1 ratio of n-6 to n-3 fatty acids in the egg yolk.

Additional objects, advantages and novel features of the invention will be set forth in part in the description which follows, and in part will become apparent to those skilled in the art upon examination of the following, or may be learned from practice of the invention.

DESCRIPTION OF THE PREFERRED EMBODIMENTS

An egg enriched with Omega-3 fatty acids is provided by the present invention. Specifically, the present invention provides eggs each containing a predetermined amount of Omega-3 fatty acids, preferably 350–450 mg and most preferably 400 mg, where at least 250 mg are C18:3 and at least 100 mg are C22:6. Eggs normally have between a 4:1 and a 6:1 ratio of Omega-6 to Omega-3 fatty acids. Preferably, the enriched eggs of the present invention have a 2:1 ratio of n-6 to n-3 fatty acids in the egg yolk. Such predetermined amounts of Omega-3 fatty acids and n-6:n-3 ratios can be provided by this invention regardless of egg size or hen age.

The present invention also provides a method for producing these Omega-3 fatty acid enriched eggs involving feeding hens a diet comprised of corn, soybean meal, flaxseed, limestone, oyster shell, dicalcium phosphate, animal/vegetable fat blend, salt, vitamin premix, mineral premix, Vitamin E premix, methionine, and pectinase and glucanase enzyme product. Wheat, barley, oats, and triticale also may be added to this feed formulation. Preferably, the proportions of these ingredients in the feed are adjusted in response to a hen's age or egg size. Preferably, hens are kept in a controlled environment having a temperature between 65 and 85° F. while they are fed this diet.

A preferred embodiment of this invention involves feeding hens in two phases. At the start of egg production or at 24 weeks of age, phase one begins. Phase I continues until the hen reaches 36 weeks of age or when eggs being produced reach 60 g in size. When this occurs, the hen is switched to Phase II of the diet which is for hens 36 weeks of age and older or for hens producing eggs weighing 60 g or more. Each hen should be fed 100–110 g of fresh feed daily. One must ensure that each hen eats approximately 12 g of flax per day while on Phase I of the diet and approximately 10 g of flax per day while on Phase II. Feed intake may be stimulated by decreasing the caloric density of the feed or reducing the temperature of the area where the hens are kept. The following are the ingredients in Phase I of the diet including the preferred and acceptable ranges of such ingredients:

| Ingredients | Preferred % By Weight | Range of % |
| --- | --- | --- |
| Corn | 48.80 | 40.00–65.00 |
| Soybean meal | 22.50 | 15.00–30.00 |
| Flaxseed | 12.50 | 12.50–15.00 |
| Corn gluten meal | 0.44 | 0.00–3.00 |
| Limestone (50:50 Blend) | 8.20 | 6.00–9.00 |
| Oyster shell | 1.50 | 0.50–2.00 |
| Dicalcium phosphate or Defluorinated phosphate | 1.84 | 1.00–2.00 |
| Animal/Vegetable Fat Blend | 3.40 | 0.50–4.00 |
| Salt | 0.32 | 0.20–0.40 |
| Vitamin premix | 0.10 | 0.05–0.25 |
| Mineral premix | 0.10 | 0.05–0.25 |
| Vitamin E premix | 0.25 | 0.05–0.40 |
| Methionine | 0.20 | 0.10–0.25 |
| Enzyme | 0.10 | 0.05–0.10 |

The following are the ingredients in Phase II of the diet including both the preferred and acceptable ranges of such ingredients:

| Ingredients | Preferred % By Weight | Range of % |
| --- | --- | --- |
| Corn | 54.60 | 40.00–65.00 |
| Soybean meal | 16.10 | 12.00–25.00 |
| Flaxseed | 10.00 | 10.00–12.00 |
| Corn gluten meal | 3.00 | 0.00–3.00 |
| Limestone (50:50 Blend) | 9.77 | 6.00–10.00 |
| Oyster shell | 1.50 | 0.50–2.00 |
| Dicalcium phosphate or Defluorinated phosphate | 1.61 | 1.00–2.00 |
| Animal/Vegetable Fat Blend | 2.61 | 0.50–4.00 |
| Salt | 0.32 | 0.20–0.40 |
| Vitamin premix | 0.10 | 0.05–0.25 |
| Mineral premix | 0.10 | 0.05–0.25 |
| Vitamin E premix | 0.25 | 0.05–0.40 |
| Methionine | 0.20 | 0.05–0.25 |
| Enzyme | 0.10 | 0.05–0.10 |

The corn used in this feed should be #2 yellow grade. It should be free of mycotoxins and molds. Preferably, it is ground to a course grind and contains approximately 8% protein and at least 88% dry matter.

The soybean meal is a high protein meal and is cooked a desirable amount. Preferably, it has a low trypsinase value. Most preferably, this soybean meal is at least 46% protein and has a trypsinase value of less than 2.0.

The flaxseed used in the diet of the present invention should be clean but need not be food grade. It may contain 2–4% weed seed and foreign material and still be of acceptable quality. Preferably, the flaxseed in the diet of the present invention contains approximately 24% protein, 35% ether extract, and 16% linolenic acid. Preferably, it is the Omega or Neche variety grown in low cadmium soils (less than 0.4 ppm cadmium analysis). Most preferably, brown flaxseed (Neche variety) is used because it increases feed consumption, egg weight and egg production compared to the golden variety. Both ground flaxseed and whole flaxseed are acceptable. If ground flaxseed is used it must be stored for short periods, such as less than two weeks. Preferably, whole flaxseed is used since it does not oxidize during storage.

The corn gluten meal is an optional ingredient. It can be eliminated without causing any loss to the quality of the enriched eggs. When added, it provides pigment to the mixture since it contains xanthophyll. The corn gluten meal should be a high protein meal. Preferably, it is 63% protein. Together, the corn, soybean meal, flaxseed and corn gluten meal provide hens a balanced protein diet thus ensuring optimal egg size.

The limestone used in the feed of the present invention is comprised of calcium carbonate in a 50:50 blend. It contains 50% large particle size calcium (greater than 4 microns), and 50% fine particle size calcium (less than 2 microns). The large particle size calcium in the limestone ensures adequate shell strength in the hens' eggs.

The oyster shell in the mixture of the present invention is natural oyster shell. Preferably, it has a particle size greater than 4 microns. Most preferably, the oyster shell is Pilot Brand which may be obtained from Ronald D. McDonough, P.O. Box 1225, Mobile, Ala. 36633.

Dicalcium phosphate and defluorinated phosphate are sources of phosphorus. Either of these ingredients are able to provide this essential nutrient to the hens.

The animal/vegetable fat blend is preferably a blend of approximately 60% high quality beef tallow and 40% vegetable oil and is stabilized by the addition of ethoxyquin. Preferably, the vegetable oil in this blend is corn or soybean oil.

Iodized salt should be used as the salt in the feed of the present invention. It should be feed grade.

Vitamin premix, mineral premix and Vitamin E premix are packaged mixtures of vitamins or minerals which are provided ready to blend with other ingredients. They should be feed grade and can be obtained from numerous sources such as International Nutrition of Omaha, Nebr. Preferably, the vitamin premix supplies 3.1–5.7 mg of folic acid, 49.3–91.5 mg of niacin, 13.1–24.3 mg of pantothenic acid, 9.2–17.2 mg of riboflavin, 9240–17,160 I.U. of Vitamin A, 15.4–28.6 mg of Vitamin B-12, 4000–7440 I.U. of Vitamin D, 3.9–7.2 I.U. of Vitamin E and 1.85–3.43 mg of Vitamin K per kilogram of feed. Most preferably, the vitamin premix supplies 4.4 mg of folic acid, 70.4 mg of niacin, 18.7 mg of pantothenic acid, 13.2 mg of riboflavin, 13,200 I.U. of Vitamin A, 22.0 mg of Vitamin B-12, 5,720 I.U. of Vitamin D, 5.5 I.U. of Vitamin E, and 2.64 mg of Vitamin K per kilogram of feed. Vitamin D, along with the large particle size calcium in the limestone, ensures adequate shell strength. Preferably, the mineral premix supplies 8.8–16.3 mg of copper, 2.1–3.9 mg of iodine, 56.0–104.0 mg of iron, 98.0–182.0 mg of manganese, 0.2–0.4 mg selenium, 98.0–182.0 mg of zinc per kilogram of feed. Most preferably, the mineral premix supplies 12.5 mg of copper, 3.0 mg of iodine, 80.0 mg of iron, 140.0 mg of manganese, 0.30 mg selenium, 140.0 mg of zinc per kilogram of feed. Supplemental Vitamin E improves egg production and ensures oxidative stability. Preferably, the Vitamin E premix supplies 31.5–58.5 I.U. of Vitamin E. Most preferably, the Vitamin E premix supplies 45.0 I.U. of Vitamin E and should be -tocopherol.

Methionine is an amino acid additive. It may be obtained from DL liquid, dry methionine or Alimet sources.

The enzyme should be a pectinase and glucanase enzyme product. Preferably, it is obtained from Finnfeeds International, Fenton, Mo. 63026.

Wheat, barley, oats and/or triticale are optional ingredients which may be added to either phase of the feed mixture. In addition, oyster shell, animal/vegetable fat blend, and the enzyme may be eliminated from the feed formulation. However, the elimination of these ingredients will decrease the success of the feeding program of the present invention.

During feed preparation, all large quantity ingredients (i.e. corn, soybean meal, flaxseed, corn gluten meal, oyster shell and limestone) should be mixed thoroughly for 10 minutes in a vertical or horizontal mixer. Next, smaller quantity dry ingredients should be added. These include salt, vitamin premix, mineral premix, Vitamin E premix and methionine. The mixture should then be mixed for 10 more minutes to adequately distribute all ingredients. Lastly, the animal/vegetable fat blend should be poured into this mixture slowly while mixing so as to avoid any clumping. The mixture should then be mixed for another 10 minutes.

The mixed feed should be stored in dry air tight containers to avoid oxidation or moisture buildup. It should be stored at a moderate temperature, preferably, less than 80° C. for a maximum of four weeks before it is fed to the hens.

The following are examples of feed formulations according to Phase I of this invention. These examples are not meant in any way to limit the scope of this invention.

EXAMPLE 1

| Ingredients | % by Weight |
| --- | --- |
| Corn | 42.70 |
| Soybean meal | 20.30 |
| Flaxseed | 15.00 |
| Limestone (50:50 Blend) | 6.00 |
| Oyster shell | 2.00 |
| Dicalcium phosphate or Defluorinated phosphate | 1.50 |
| Animal/Vegetable Fat Blend | 0.50 |
| Salt | 0.40 |
| Vitamin premix | 0.25 |
| Mineral premix | 0.25 |
| Vitamin E premix | 0.40 |
| Methionine | 0.20 |
| Enzyme | 0.10 |
| Oats | 10.50 |

EXAMPLE 2

| Ingredients | % by Weight |
| --- | --- |
| Corn | 48.80 |
| Soybean meal | 22.80 |
| Flaxseed | 12.50 |
| Corn gluten meal | 0.50 |
| Limestone (50:50 Blend) | 8.20 |
| Oyster shell | 1.50 |
| Dicalcium phosphate or Defluorinated phosphate | 1.80 |
| Animal/Vegetable Fat Blend | 3.40 |
| Salt | 0.30 |
| Vitamin premix | 0.05 |
| Mineral premix | 0.05 |
| Vitamin E premix | 0.05 |
| Methionine | 0.10 |
| Enzyme | 0.05 |

The following are examples of feed formulations according to Phase II of this invention. These examples are not meant in any way to limit the scope of this invention.

EXAMPLE 1

| Ingredients | % by Weight |
| --- | --- |
| Corn | 54.60 |
| Soybean meal | 16.10 |
| Flaxseed | 10.00 |
| Limestone (50:50 Blend) | 9.80 |
| Oyster shell | 1.50 |
| Dicalcium phosphate or Defluorinated phosphate | 1.60 |
| Animal/Vegetable Fat Blend | 2.60 |
| Salt | 0.40 |
| Vitamin premix | 0.15 |
| Mineral premix | 0.15 |
| Vitamin E premix | 0.20 |
| Methionine | 0.20 |
| Enzyme | 0.06 |
| Corn Gluten Meal | 3.00 |

EXAMPLE 2

| Ingredients | % by Weight |
| --- | --- |
| Corn | 46.30 |
| Soybean meal | 24.30 |
| Flaxseed | 11.00 |
| Corn gluten meal | 8.70 |
| Limestone (50:50 Blend) | 7.00 |
| Oyster shell | 0.50 |
| Dicalcium phosphate or Defluorinated phosphate | 1.50 |
| Salt | 0.30 |
| Vitamin premix | 0.05 |
| Mineral premix | 0.10 |
| Vitamin E premix | 0.10 |
| Methionine | 0.10 |
| Enzyme | 0.07 |

In the alternative, the ingredients in this feed may be varied so long as certain nutrients are provided in the feed and so long as the dietary fat composition and sources remain similar to that of the diets listed above. Significant changes in the diets listed above are not recommended and such diets could alter the desired product composition. The preferred and acceptable ranges of nutrients which should be provided in Phase I are as follows:

| Nutrients | Preferred % By Weight (unless another unit of measure is indicated) | Range of % (unless another unit of measure is indicated) |
| --- | --- | --- |
| Protein | 17.50 | 17.00–19.50 |
| Metabolizable energy, kcal/kg | 2,900 | 2,850–3,050 |
| Methionine | 0.45 | 0.40–0.48 |
| TSAA | 0.75 | 0.70–0.76 |
| Lysine | 0.96 | 0.85–1.10 |
| Calcium | 4.20 | 3.80–4.40 |
| Available P | 0.45 | 0.40–0.50 |
| Vitamin D, IU/kg | 8,000 | 5,000–8,000 |
| Vitamin E, IU/kg | 60 | 40–70 |
| Linoleic acid | 2.63 | 2.50–2.70 |
| Linolenic acid | 2.10 | 1.90–2.30 |
| Sodium | 0.18 | 0.15–0.24 |

The following amounts of nutrients should be provided in Phase II of the feed:

| Nutrients | Preferred % By Weight (unless another unit of measure is indicated) | Range of % (unless another unit of measure is indicated) |
| --- | --- | --- |
| Protein | 16.00 | 15.00–17.00 |
| Metabolizable energy, kcal/kg | 2,860 | 2,800–2,960 |
| Methionine | 0.39 | 0.33–0.40 |
| TSAA | 0.68 | 0.62–0.68 |
| Lysine | 0.85 | 0.80–1.0 |
| Calcium | 4.70 | 4.00–4.80 |
| Available P | 0.40 | 0.32–0.40 |
| Vitamin D, IU/kg | 5,000 | 3,000–6,000 |
| Vitamin E, IU/kg | 60 | 40–70 |
| Linoleic acid | 2.88 | 2.50–2.90 |
| Linolenic acid | 2.52 | 1.90–2.60 |
| Sodium | 0.17 | 0.14–0.22 |

Once a hen is fed the Phase I diet for approximately three weeks, the hen's eggs become sufficiently enriched to be marketed as enriched eggs within the scope of this invention. The enriched eggs should be collected daily and refrigerated immediately to approximately 42° F. The eggs should then be candled, graded and packed for sale within five days to assure freshness. Storing eggs for more than five days prior to packaging for sale could result in oxidative products and an undesirable flavor in the eggs. Within two weeks of when the eggs are laid, they should be sold to consumers.

The total egg yolk lipid, cholesterol and fatty acid composition of twelve eggs per flock of hens on this program should be analyzed quarterly. These laboratory results should be used to correctly label egg cartons.

Since dietary sources of Omega-3 fatty acids are currently limited to certain types of fish and oilseeds, incorporating these beneficial fatty acids into eggs provides consumers with an additional dietary source of Omega-3 fatty acids. Additional consumption of Omega-3 fatty acids by consumers will decrease the incidence of cardiovascular disease, improve HDL:LDL cholesterol ratios, and reduce serum triglyceride levels.

From the foregoing, it will be seen that this invention is one well adapted to attain all the ends and objects hereinabove set forth together with other advantages which are obvious and inherent. It will be understood that certain features and subcombinations are of utility and may be employed without reference to their features and subcombinations. This is contemplated by and is within the scope of the claims. Since many possible embodiments may be made of the invention without departing from the scope thereof, it is to be understood that all matter herein set forth is to be interpreted as illustrative and not in a limiting sense.

I claim:

1. A method for producing Omega-3 fatty acid enriched eggs, comprising:

mixing a feed comprised of corn, soybean meal, flaxseed, oyster shell, limestone, salt, vitamin premix, mineral premix, Vitamin E premix, methionine, animal/vegetable fat blend, pectinase and glucanase enzyme product, and phosphorus;

feeding a hen said feed ration of 100–110 g per day; and having said hen lay enriched eggs.

2. A method as in claim 1 wherein said phosphorus is provided by dicalcium phosphate or defluorinated phosphate.

3. A method as in claim 1 further comprising:

adjusting the proportions of ingredients in said feed ration in response to egg size.

4. A method as in claim 1 further comprising:

adjusting the proportions of ingredients in said feed in response to the age of said hen.

5. A method as in claim 1 wherein said hen is fed a feed ration comprised of 40–65% corn, 15–30% soybean meal, 12.5–15.0% flaxseed, 6–9% limestone, 0.5–2.0% oyster shell, 1.0–2.0% dicalcium phosphate or defluorinated phosphate, 0.5–4% animal/vegetable fat blend; 0.2–0.4% salt, 0.05–0.25% vitamin premix, 0.05–0.25% mineral premix, 0.05–0.40% Vitamin E premix, 0.10–0.25% methionine, and 0.05–0.10% pectinase and glucanase enzyme product while said hen is between 24 and 36 weeks of age, and wherein said hen is fed a feed ration comprised of 40–65% corn, 12–25% soybean meal, 10.0–12.0% flaxseed, 6–10% limestone, 0.5–2.0% oyster shell, 1.0–2.0% dicalcium phosphate or defluorinated phosphate, 0.5–4% animal/vegetable fat blend; 0.2–0.4% salt, 0.05–0.25% vitamin premix, 0.05–0.25% mineral premix, 0.05–0.40% Vitamin E premix, 0.10–0.25% methionine, and 0.05–0.10% pectinase and glucanase enzyme product after said hen reaches 36 weeks of age.

6. A method as in claim 1 wherein said hen is fed a feed ration comprised of 40–65% corn, 15–30% soybean meal, 12.5–15.0% flaxseed, 6–9% limestone, 0.5–2.0% oyster shell 1.0–2.0% dicalcium phosphate or defluorinated phosphate, 0.5–4% animal/vegetable fat blend; 0.2–0.4% salt, 0.05–0.25% vitamin premix, 0.05–0.25% mineral premix, 0.05–0.40% Vitamin E premix, 0.10–0.25% methionine, and 0.05–0.10% pectinase and glucanase enzyme product while said hen lays eggs weighing approximately 60 g or less, and wherein said hen is fed a feed ration comprised of 40–65% corn, 12–25% soybean meal, 10.0–12.0% flaxseed, 6–10% limestone, 0.5–2.0% oyster shell, 1.0–2.0% dicalcium phosphate or defluorinated phosphate, 0.5–4% animal/vegetable fat blend; 0.2–0.4% salt, 0.05–0.25% vitamin premix, 0.05–0.25% mineral premix, 0.05–0.40% Vitamin E premix, 0.10–0.25% methionine, and 0.05–0.10% pectinase and glucanase enzyme product after said hen begins laying eggs weighing approximately 60 g or more.

7. A method as in claim 1 wherein said hen is fed a feed ration comprised of 17.0–19.5% protein, 2,850–3,050 kcal/kg metabolizable energy, 0.40–0.48% methionine, 0.70–0.76% total sulfur amino acids (TSAA), 0.85–1.1% lysine, 3.8–4.4% calcium, 0.40–0.50% phosphorus, 5,000–8,000 IU/kg Vitamin D, 40–70 IU/kg Vitamin E, 2.5–2.7% linoleic acid, 1.9–2.3% linolenic acid, and 0.15–0.24% sodium while said hen is between 24 and 36 weeks of age, and wherein said hen is fed a feed ration comprised of 15–17% protein, 2,800–2,960 kcal/kg metabolizable energy, 0.33–0.40% methionine, 0.62–0.68% TSAA, 0.80–1.0% lysine, 4.0–4.8% calcium, 0.32–0.40% phosphorus, 3,000–6,000 IU/kg Vitamin D, 40–70 IU/kg Vitamin E, 2.5–2.9% linoleic acid, 1.9–2.6% linolenic acid, and 0.14–0.22% sodium after said hen reaches 36 weeks of age.

8. A method as in claim 1 wherein said hen is fed a feed ration comprised of 17.0–19.5% protein, 2,850–3,050 kcal/kg metabolizable energy, 0.40–0.48% methionine, 0.70–0.76% TSAA, 0.85–1.1% lysine, 3.8–4.4% calcium, 0.40–0.50% phosphorus, 5,000–8,000 IU/kg Vitamin D, 40–70 IU/kg Vitamin E, 2.5–2.7% linoleic acid, 1.9–2.3% linolenic acid, and 0.15–0.24% sodium while said hen lays eggs weighing approximately 60 g or less, and wherein said hen is fed a feed ration comprised of 15–17% protein, 2,800–2,960 kcal/kg metabolizable energy, 0.33–0.40% methionine, 0.62–0.68% TSAA, 0.80–1.0% lysine, 4.0–4.8% calcium, 0.32–0.40% phosphorus, 3,000–6,000 IU/kg Vitamin D, 40–70 IU/kg Vitamin E, 2.5–2.9% linoleic acid, 1.9–2.6% linolenic acid, and 0.14–0.22% sodium after said hen begins laying eggs weighing approximately 60 g or more.

9. A method as in claim 1 wherein said hen is kept in a controlled environment having a temperature between 65 and 85 ° F.

10. A method as in claim 1, further comprising:

collecting said eggs daily; and refrigerating said eggs at approximately 42° F.

11. A method as in claim 1 wherein said hen lays eggs containing 350–450 mg of Omega-3 fatty acids regardless of egg size or age.

12. A method as in claim 1 wherein said hen lays eggs containing 400 mg of Omega-3 fatty acids.

13. A feed for hens, comprising:
   corn;
   soybean meal;
   flaxseed;
   oyster shell;
   limestone;
   salt;
   vitamin premix;
   mineral premix;
   Vitamin E premix;
   methionine;
   animal/vegetable fat blend;
   pectinase & glucanase enzyme product; and
   phosphorus.

14. A feed for hens as in claim 13 wherein said phosphorus is provided by dicalcium phosphate or defluorinated phosphate.

15. A feed as in claim 13 wherein said limestone is comprised of large particle size calcium.

16. A feed as in claim 13, further comprising corn gluten meal, wheat, barley, oats or triticale.

17. A feed as in claim 13 wherein said feed is comprised of 40–65% corn, 15–30% soybean meal, 12.5–15.0% flaxseed, 0–3.0% corn gluten meal, 6–9% limestone, 0.5–2.0% oyster shell, 1.0–2.0% dicalcium phosphate or defluorinated phosphate, 0.5–4% animal/vegetable fat blend; 0.2–0.4% salt, 0.05–0.25% vitamin premix, 0.05–0.25% mineral premix, 0.05–0.40% Vitamin E premix, 0.10–0.25% methionine, and 0.05–0.10% pectinase and glucanase enzyme product.

18. A feed as in claim 13 wherein said feed is comprised of 48.8% corn, 22.5% soybean meal, 12.5% flaxseed, 0.44% corn gluten meal, 8.2% limestone, 1.5% oyster shell, 1.84% dicalcium phosphate, 3.4% animal/vegetable fat blend; 0.32% salt, 0.10% vitamin premix, 0.10% mineral premix, 0.25% Vitamin E premix, 0.20% methionine, and 0.10% pectinase and glucanase enzyme product.

19. A feed as in claim 13 wherein said feed is comprised of 40–65% corn, 12–25% soybean meal, 10.0–12.0% flaxseed, 0–3.0% corn gluten meal, 6–10% limestone, 0.5–2.0% oyster shell, 1.0–2.0% dicalcium phosphate or defluorinated phosphate, 0.5–4% animal/vegetable fat blend; 0.2–0.4% salt, 0.05–0.25% vitamin premix, 0.05–0.25% mineral premix, 0.05–0.40% Vitamin E premix, 0.10–0.25% methionine, and 0.05–0.10% pectinase and glucanase enzyme product.

20. A feed as in claim 13 wherein said feed is comprised of 56.6% corn, 16.1% soybean meal, 10.0% flaxseed, 3.0% corn gluten meal, 9.77% limestone, 1.5% oyster shell, 1.61% dicalcium phosphate, 2.61% animal/vegetable fat blend; 0.32% salt, 0.10% vitamin premix, 0.10% mineral premix, 0.25% Vitamin E premix, 0.20% methionine, and 0.10% pectinase and glucanase enzyme product.

21. A feed as in claim 13 wherein said feed is comprised of 17.0–19.5% protein, 2,850–3,050 kcal/kg metabolizable energy, 0.40–0.48% methionine, 0.70–0.76% TSAA, 0.85–1.1% lysine, 3.8–4.4% calcium, 0.40–0.50% phosphorus, 5,000–8,000 IU/kg Vitamin D, 40–70 IU/kg Vitamin E, 2.5–2.7% linoleic acid, 1.9–2.3% linolenic acid, and 0.15–0.24% sodium.

22. A feed as in claim 13 wherein said feed is comprised of 17.5% protein, 2,900 kcal/kg metabolizable energy, 0.45% methionine, 0.75% TSAA, 0.96% lysine, 4.2% calcium, 0.45% phosphorus, 8,000 IU/kg Vitamin D, 60 IU/kg Vitamin E, 2.63% linoleic acid, 2.10% linolenic acid, and 0.18% sodium.

23. A feed as in claim 13 wherein said feed is comprised of 15–17% protein, 2,800–2,960 kcal/kg metabolizable energy, 0.33–0.40% methionine, 0.62–0.68% TSAA, 0.80–1.0% lysine, 4.0–4.8% calcium, 0.32–0.40% phosphorus, 3,000–6,000 IU/kg Vitamin D, 40–70 IU/kg Vitamin E, 2.5–2.9% linoleic acid, 1.9–2.6% linolenic acid, and 0.14–0.22% sodium.

24. A feed as in claim 13 wherein said feed is comprised of 16% protein, 2,860 kcal/kg metabolizable energy, 0.39% methionine, 0.68% TSAA, 0.85% lysine, 4.7% calcium, 0.40% phosphorus, 5,000 IU/kg Vitamin D, 60 IU/kg Vitamin E, 2.88% linoleic acid, 2.52% linolenic acid, and 0.17% sodium.

* * * * *